(12) United States Patent
Moore et al.

(10) Patent No.: US 11,879,023 B2
(45) Date of Patent: Jan. 23, 2024

(54) ARTICLES COMPRISING CROSSLINKED POLYMER NETWORK COMPRISING THIOETHER CROSSLINKS AND PROCESS OF MAKING AND USING SAME

(71) Applicant: Government of the United States, as represented by the Secretary of the Air Force, Wright-Patterson AFB, OH (US)

(72) Inventors: Levi Michael Joseph Moore, Lancaster, CA (US); Jacob C. Marcischak, Tehachapi, CA (US); Timothy S. Haddad, Lancaster, CA (US); Kamran B. Ghiassi, Palmdale, CA (US); Gregory R. Yandek, Tehachapi, CA (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 299 days.

(21) Appl. No.: 17/395,327

(22) Filed: Aug. 5, 2021

(65) Prior Publication Data
US 2022/0056161 A1    Feb. 24, 2022

Related U.S. Application Data

(60) Provisional application No. 63/068,477, filed on Aug. 21, 2020.

(51) Int. Cl.
| | | |
|---|---|---|
| *C08F 2/46* | (2006.01) | |
| *C08F 2/50* | (2006.01) | |
| *C08G 61/04* | (2006.01) | |
| *C08C 19/28* | (2006.01) | |
| *C08C 19/20* | (2006.01) | |
| *C08L 11/00* | (2006.01) | |
| *C08L 9/06* | (2006.01) | |

(52) U.S. Cl.
CPC .............. *C08C 19/28* (2013.01); *C08C 19/20* (2013.01); *C08L 9/06* (2013.01); *C08L 11/00* (2013.01); *C08L 2312/00* (2013.01)

(58) Field of Classification Search
CPC .... C08K 3/36; C08K 5/14; C08K 5/37; C08F 136/06; C08F 2/48; C08C 19/28; C08C 19/20; C08L 11/00; C08L 9/06; C08L 9/00; C08L 2312/00
USPC ............. 522/24, 7, 6, 189, 184, 71, 1; 520/1
See application file for complete search history.

(56) References Cited

U.S. PATENT DOCUMENTS

| | | |
|---|---|---|
| 8,844,133 B2 | 9/2014 | Fuller |
| 9,788,604 B2 | 10/2017 | Jarvis |
| 2019/0390081 A1 | 12/2019 | Rolland et al. |
| 2020/0032062 A1 | 1/2020 | Wallin et al. |
| 2020/0361136 A1 * | 11/2020 | Fenn .................... B29C 64/336 |

FOREIGN PATENT DOCUMENTS

| | | | |
|---|---|---|---|
| EP | 1477511 A1 | 11/2004 | |
| WO | WO-2019035099 A1 * | 2/2019 | ............. B29C 64/10 |
| WO | 2020212785 A1 | 10/2020 | |
| WO | WO-2020212785 A1 * | 10/2020 | ......... C06B 21/0025 |

OTHER PUBLICATIONS

ASTM D2084—19a, Standard Test Method for Rubber Property—Vulcanization Using Oscillating Disk Cure Meter, 2019, 1-11.
Bragaglia, M.; Lamastra, F. R.; Cherubini, V.; Nanni, F.; 3D printing of polybutadiene rubber cured by photo-induced thiol-ene chemistry: A proof of concept, eXPRESS Polymer Letters vol. 14, No. 6 (2020) 576-582.
Liu, X.; Zhou, T.; Liu, Y.; Zhang, A.; Yuan, C.; Zhang, W.; Cross-linking process of cis-polybutadiene rubber with peroxides studied by two-dimensional infrared correlation spectroscopy: a detailed tracking, RSC Adv., 2015, 5, 10231-10242.
Liu, X.; Zhou, T.; Liu, Y.; Zhang, A.; Yuan, C.; Zhang, W.; Electronic Supp. Material For: Cross-linking process of cis-polybutadiene rubber with peroxides studied by two-dimensional infrared correlation spectroscopy: a detailed tracking, RSC Adv., 2015, 5, 1-3.
A. Mujtaba, A.; Keller, M.; Ilisch, S.; Radusch, H. J.; Thurn-Albrecht, T.; Saalwachter, K.; Beiner, M.;Mechanical Properties and Cross-Link Density of Styrene-Butadiene Model Composites Containing Fillers with Bimodal Particle Size Distribution, Macromolecules 2012, 45, 6504-6515.
Guenthner, A. J.; Marcischak, J. C.; J. Mabry, M.; Ford, M. D.; Haddad, T. S.; Reams, J. T.; Isocyanate-Free Energetic Binder Systems Based on Thiol-Ene Chemistry Conference Paper 2015, 1-11 (ITAR Document Statement C: Distribution authorized to U.S. Government agencies and their contractors; Critical Technology, Export Controlled; Oct. 2015.).

* cited by examiner

*Primary Examiner* — Jessica Whiteley
(74) *Attorney, Agent, or Firm* — AFMCLO/JAZ; James F. McBride (57) ABSTRACT

The present invention relates to articles comprising crosslinked polymer network comprising thioether crosslinks and process of making and using same. Such thiol-ene crosslinking reactions not only make the isocyanate crosslinking reaction unnecessary, but they also improve the article's strength due to chemical crosslinking between the article's resin layers, and reduce or eliminate post curing. Thus resulting in a sufficiently cured article in a much shorter time.

8 Claims, 1 Drawing Sheet

ARTICLES COMPRISING CROSSLINKED POLYMER NETWORK COMPRISING THIOETHER CROSSLINKS AND PROCESS OF MAKING AND USING SAME

CROSS-REFERENCE TO RELATED APPLICATION

The present application claims priority to U.S. Provisional Application Ser. No. 63/068,477 filed Aug. 21, 2020, the contents of which is hereby incorporated by reference in its entry.

RIGHTS OF THE GOVERNMENT

The invention described herein may be manufactured and used by or for the Government of the United States for all governmental purposes without the payment of any royalty.

FIELD OF THE INVENTION

The present invention relates to articles comprising cross-linked polymer network comprising thioether crosslinks and process of making and using same.

BACKGROUND OF THE INVENTION

Processes such as casting and 3D printing are used to make articles. For example, 3-dimensional (3D) printing makes three-dimensional objects by building up material, based upon design data provided from a computer aided design (CAD) system. One technique is to deposit a resolidifiable material in a predetermined pattern, according to design data provided from a CAD system, with the build-up of multiple layers forming the object. The resolidifiable materials can be either in the form of filaments, powdered resins or liquid resins. When liquid resins are used as a raw material, the additive manufacturing processes that are used include direct ink writing and vat photopolymerization (VP)—examples of VP include but are not limited to techniques such as stereolithography (SLA), digital light processing (DLP), masked stereolithogrpahy (MSLA), and liquid crystal display (LCD) 3D printing. A common liquid resin raw material used in current casting processes comprises a polybutadiene because polybutadiene is flexible. In order to form a useable article, the liquid resin polybutadiene raw material must be cured—typically via an environmentally, undesirable isocyanate crosslinking reaction with the hydroxyl groups found on such liquid resin. Such curing is initiated during the manufacturing process via thermal energy but unfortunately may only be complete after a significant period of time has passed. As a result, the articles produced by such casting process are not available for use in the time desired. In order to solve such problem, industry has resorted to thermal post curing processes. Unfortunately, thermal post curing still does not offer the desired curing speed and such post curing can thermally degrade the article being cured. Furthermore, liquid resin polybutadiene raw material are typically not used in 3D printing processes as the thermal energy needed to cure the resulting article is not generally obtainable, and the required level of catalyst needed to effect a cure with the thermal energy available in a 3D process causes the liquid resin polybutadiene raw material to cure prior to printing. Thus, such resin becomes unprintable.

Liquid resins used in additive manufacturing not only contain hydroxyl groups but also a sufficient number of vinyl groups to permit a rapid thiol-ene crosslinking reaction that can make the aforementioned isocyanate crosslinking reaction unnecessary. Current processes employing thiol-ene crosslinking reactions use thiol crosslinkers that contain esters. Such thiol-ene crosslinking reactions not only make the isocyanate crosslinking reaction unnecessary, but they also improve the article's strength due to chemical crosslinking between the article's resin layers, and reduce or eliminate post curing. Thus resulting in a sufficiently cured article in a much shorter time.

Unfortunately, Articles produced via the current processes are not as environmentally stable as desired. Applicants recognized that this lack of stability is driven by certain environmental conditions such as water the presence of water. While not being bound by theory, Applicants believe that ester linkages arising from the use of thiol ester crosslinkers are degrading via chemical processes that include hydrolysis. As a result of such linkage degradation, the physical properties of articles made by current processes degrade—eventually rendering the article unusable. Applicants recognized the drawbacks of the teachings of current processes, and disclose a process wherein superior non ester based thiol crosslinkers and processing conditions are employed. Articles produced by Applicants' processes are surprisingly more robust, and more stable in environmental conditions that are deleterious to currently produced articles. As result, articles made by Applicants' process remain stable for a longer period of time. As a result of Applicants' discoveries, Applicants disclose an additive manufacturing process that works across the breadth of low temperature applications and yet results in articles that surprisingly more robust and more stable in environmental conditions that are deleterious to currently produced articles.

SUMMARY OF THE INVENTION

The present invention relates to articles comprising crosslinked polymer network comprising thioether crosslinks and process of making and using same. Such thiol-ene crosslinking reactions not only make the isocyanate crosslinking reaction unnecessary, but they also improve the article's strength due to chemical crosslinking between the article's resin layers, and reduce or eliminate post curing. Thus resulting in a sufficiently cured article in a much shorter time.

BRIEF DESCRIPTION OF THE DRAWINGS

The accompanying drawings, which are incorporated in and constitute a part of this specification, illustrate embodiments of the invention and, together with the summary given above, and the detailed description given below, serve to explain the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Definitions

Figure 1:
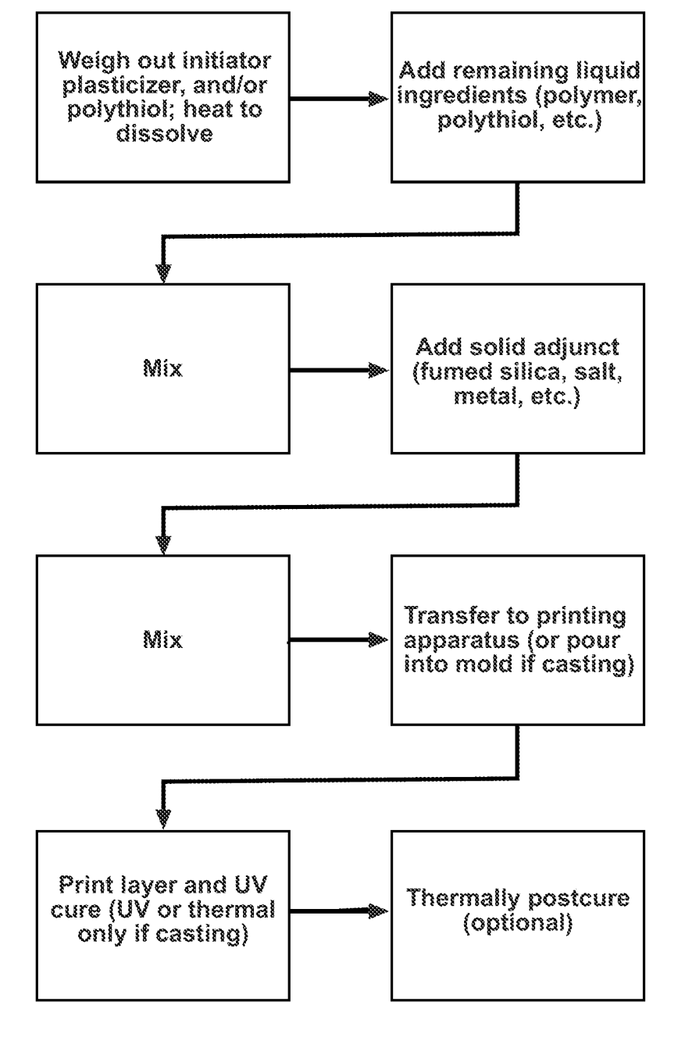
FIG. 1 is a process diagram depicting a process for producing a 3D printable resin, 3D printing with such resin to form a 3D article and curing such article.

Unless specifically stated otherwise, as used herein, the terms "a", "an" and "the" mean "at least one".

As used herein, the terms "include", "includes" and "including" are meant to be non-limiting.

As used herein, the words "about," "approximately," or the like, when accompanying a numerical value, are to be construed as indicating a deviation as would be appreciated by one of ordinary skill in the art to operate satisfactorily for an intended purpose.

As used herein, the words "and/or" means, when referring to embodiments (for example an embodiment having elements A and/or B) that the embodiment may have element A alone, element B alone, or elements A and B taken together.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Articles

For purposes of this specification, headings are not considered paragraphs and thus this paragraph is paragraph eighteen of the present specification. The individual number of each paragraph above and below this paragraph can be determined by reference to this paragraph's number. In this paragraph eighteen, Applicants disclose an article comprising a crosslinked polymer network, said crosslinked polymer network comprising:

a) thioether crosslinks, said thiol of said thioether crosslinks being derived from a polythiol crosslinker is selected from the group consisting of 1,4-butanedithiol; 4,5-bis(mercaptomethyl)-o-xylene; 1,4-benzenedithiol; 4,4'-biphenyldithiol; 1,3,5-benzenetrithiol; 2,3-butanedithiol; 1,3-benzenedithiol; 1,10-decanedithiol; DL-dithiothreitol; dithioerythritol; 1,5-dimercaptonaphthalene; 3,6-dioxa-1,8-octanedithiol; 3,7-dithia-1,9-nonanedithiol; 1,2-ethanedithiol; 1,6-hexanedithiol; bis(2-mercaptoethyl) sulfide; 1,8-octanedithiol; 1,9-nonanedithiol 1,3-propanedithiol; 1,5-pentanedithiol; 4,4'-thiobisbenzenethiol; tetra(ethylene glycol) dithiol; 1,11-undecanedithiol; hexa(ethylene glycol) dithiol; 1,16-hexadecanedithiol, thiol-functional polymers like telechelic thiol-functional poly(ethylene glycol) and mixtures thereof; preferably said polythiol crosslinker is selected from the group consisting of 1,4-butanedithiol; 2,3-butanedithiol; 1,10-decanedithiol; DL-dithiothreitol; dithioerythritol; 3,6-dioxa-1,8-octanedithiol; 3,7-dithia-1,9-nonanedithiol; 1,6-hexanedithiol; bis(2-mercaptoethyl) sulfide; 1,8-octanedithiol; 1,9-nonanedithiol; 1,5-pentanedithiol, tetra(ethylene glycol) dithiol; 1,11-undecanedithiol; hexa(ethylene glycol) dithiol; 1,16-hexadecanedithiol and mixtures thereof; more preferably said polythiol crosslinker is selected from the group consisting of 3,6-dioxa-1,8-octanedithiol; 1,9-nonanedithiol, and mixtures thereof. As will be appreciated by the skilled artisan, when the crosslinked polymer network comprising thioether crosslinks is derived from polymer having a functional of two, such as, vinyl ether terminated poly(tetramethylene oxide) the thiol of said thioether is derived from a polythiol having a functionality of greater than two.

b) said polymer network derived from a polydiene polymer, polydiene copolymer, hydrogenated vinyl ether-terminated polyolefin and/or vinyl ether terminated poly(tetramethylene oxide), preferably said polydiene polymer and said polydiene copolymer are selected from the group consisting of poly(1,3-butadiene), poly(1,4-pentadiene), polyisoprene, polychloroprene, polybromoprene, butadiene-acrylonitrile copolymer, and/or butadiene styrene copolymer; more preferably said polymer is selected from poly(1,3-butadiene), polyisoprene, polychloroprene, and/or polybromoprene; even more preferably said polymer is selected from poly(1,3-butadiene), polyisoprene, and/or polychloroprene; most preferably said polymer is selected from the group consisting of, poly(1,3-butadiene) and/or polyisoprene.

Applicants disclose an article according to Paragraph 0015, wherein said polymer network has a crosslink density of from about $1 \times 10^{-5}$ mol/cm$^3$ to about 0.01 mol/cm$^3$, preferably from about $1 \times 10^{-4}$ mol/cm$^3$ to about $5 \times 10^{-3}$ mol/cm$^3$, more preferably from about $2 \times 10^{-4}$ mol/cm$^3$ to about $1 \times 10^{-3}$ mol/cm$^3$, most preferably from about $3 \times 10^{-4}$ mol/cm$^3$ to about $5 \times 10^{-4}$ mol/cm$^3$. Articles that typically have crosslinking density on the lower end of Applicants' range of crosslinking density include solid rocket propellant grain, sealants, matrix component for stretchable electronics, inflatable grippers. Articles that typically have crosslinking density in the midrange of Applicants' range of crosslinking density include gaskets, seals, hoses, grips, responsive surfaces, shoe insoles, lattices, and dust shields, and articles that typically have crosslinking density in the high range of Applicants' range of crosslinking density include bushings, solid wheels, bumpers, shoe soles.

Applicants disclose an article according to Paragraphs 0015 through 0016 said article comprising one or more entrained adjuncts, said one or more entrained adjuncts being selected from the group consisting of acetamide, acetyltributylcitrate, benzyl benzoate, benzyl butyl phthalate, bis(2-ethylhexyl) adipate, bis(2-ethylhexyl) phthalate, centralite, 1,2-cyclohexane dicarboxylic acid diisononyl ester, dibutyl phthalate, dibutyl sebacate, diethylene glycol dinitrate, diisobutyl phthalate, diisodecyl phthalate, diisononyl phthalate, dimethyl adipate, dimethyl methylphosphonate, 2,4-dinitrotoluene, dioctyl adipate, dioctyl sebacate, dioctyl terephthalate, dipropylene glycol, biobased oils, epoxidized soybean oil, fatty acids (stearic, lauryl, linoleic, oleic), soybean oil, ethyl butyrate, ethylene carbonate, furoin, linseed oil, maleic acid dibutyl ester, naphtha, neopentyl glycol, paraffin, polybutene, polychlorinated biphenyl, polychlorinated terphenyl, propylene carbonate, tris(1-(2-methyl))aziridinyl phosphine oxide, trimesoyl-1-(2-ethyl)aziridine, tetraethylenepentamine acrylonitrile glycidol adduct, partially cyanoacrylated tetraethylenepentamine, isophthaloyl-bis(methyl-ethyleneimide), triacetin, tributyl phosphate, tricresyl phosphate, triethyl phosphate, triethylene glycol dinitrate, trimethylolethane trinitrate, metal oxides (alumina, iron oxide, titanium dioxide, zirconium oxide, zinc oxide), talc, glass (both fibers and beads), metal carbonates (including magnesium and calcium), salts (nitrates, perchlorates, sulfates), metals (magnesium, aluminum, iron, silver, copper, gold), carbon black, carbon nanotubes, graphene, graphene oxide, clays, cellulose, nanocellulose, precipitated silica, fumed silica, polyhedral oligomeric silsesquioxane, and mixtures thereof, preferably said one or more entrained adjuncts being selected from the group consisting of acetyltributylcitrate, benzyl benzoate, benzyl butyl phthalate, bis(2-ethylhexyl) adipate, bis(2-ethylhexyl) phthalate, centralite, 1,2-cyclohexane dicarboxylic acid diisononyl ester, dibutyl phthalate, dibutyl sebacate, diethylene glycol dinitrate, diisobutyl phthalate, diisodecyl phthalate, diisononyl phthalate, dimethyl adipate, dimethyl methylphosphonate, 2,4-dinitrotoluene, dioctyl adipate, dioctyl sebacate, dioctyl terephthalate, dipropylene glycol, biobased oils, ethyl butyrate, ethylene carbonate, furoin, maleic acid dibutyl ester, neopentyl glycol, polybutene, propylene carbonate, triacetin, tributyl phosphate, tricresyl phosphate, triethyl phosphate, triethylene glycol dinitrate, trimethylolethane trinitrate, metal oxides, metal carbonates, salts, metals, carbon black, clays, cellulose, nanocellulose, precipitated silica, fumed silica, and mixtures thereof, more preferably said one or more entrained adjuncts being selected from the group consisting of bis(2-ethylhexyl) adipate, bis(2-ethylhexyl) phthalate, dibutyl phthalate, dibutyl sebacate, diisobutyl phthalate, diisodecyl phthalate, diisononyl phthalate, dimethyl adipate, dioctyl adipate, dioctyl sebacate, dioctyl terephthalate, dipropylene glycol, ethyl butyrate, ethylene carbonate, furoin, maleic acid dibutyl ester, neopentyl glycol, polybutene, propylene carbonate, metal oxides, salts, metals, carbon black, cellulose, nanocellulose, fumed silica, and mixtures thereof, most preferably said one or more entrained adjuncts being selected from the group consisting of bis(2-ethylhexyl) adipate, dibutyl sebacate, dimethyl adipate, dioctyl adipate, dioctyl sebacate, fumed silica, metals, salts, and mixtures thereof. Liquid adjuncts act as plasticizers and bonding agents, and can impart increased flexibility and processability to the part, improving the mechanical properties like extensibility, in particular in the low temperature range. Solids can impart a number of properties, from reinforcement to thickener to oxidizer and/or fuel in a solid propellant. Fumed silica is a thickening agent and allows the use of direct ink writing. Aluminum and ammonium perchlorate are fuel and oxidizer for solid rocket motors. Organic additives can do a number of things, like tougheners, nanomaterials for nanocomposites (polyhedral oligomeric silsesquioxane, clay, carbon nanotube, etc.), or energetics to make nanocomposites or 3D printed explosives.

Applicants disclose an article according to Paragraph 0017 wherein said one or more entrained adjuncts is present, based on said article weight percent, at a level of from about 0 wt. % to about 99 wt. %; preferably said one or more entrained adjuncts is present, based on said article mass percent, at a level of from about 5 wt. % to about 93 wt. %; more preferably said one or more entrained adjuncts is present, based on said article mass percent, at a level of from about 10 wt. % to about 91 wt. %; most preferably said one or more entrained adjuncts is present, based on said article mass percent, at a level of from about 15 wt. % to about 90 wt. %.

Applicants disclose an article according to any preceding claim wherein said polymer network is derived from a linear polydiene polymer, a linear polydiene copolymer, hydrogenated vinyl ether-terminated polyolefin and/or vinyl ether terminated poly(tetramethylene oxide), preferably said linear polydiene polymer and said linear polydiene copolymer are selected from the group consisting of linear poly(1,3-butadiene), linear poly(1,4-pentadiene), linear polyisoprene, linear polychloroprene, linear polybromoprene, linear butadiene-acrylonitrile copolymer, and/or linear butadiene styrene copolymer; more preferably said polymer is selected from linear poly(1,3-butadiene), linear polyisoprene, linear polychloroprene, and/or linear polybromoprene; even more preferably said polymer is selected from linear poly(1,3-butadiene), linear polyisoprene, and/or linear polychloroprene; most preferably said polymer is selected from the group consisting of, linear poly(1,3-butadiene) and/or linear polyisoprene. The advantages of using the aforementioned linear polymers include but are not limited to lower cost than branched hydroxyl-terminated polybutadiene; greater flexibility in resin choice with regards to molecular weight, viscosity, glass transition temperature, and polymer microstructure (cis, trans, and vinyl content); easier processing due to lower viscosity; and more flexibility in choice of resin properties like modulus, that can be tuned through formulation.

Applicants disclose a solid rocket propellant grain, sealant, matrix component for stretchable electronics, inflatable gripper, gasket, seal, hose, grip, responsive surface, shoe insole, lattice, dust shield, bushing, solid wheel, bumper, or shoe sole comprising an article according to Paragraphs 0015 through 0019. In one aspect, a solid rocket propellant grain, sealant, matrix component for stretchable electronics, inflatable gripper, gasket, seal, hose, and/or grip comprises an article according to any preceding claim. In another aspect, a solid rocket propellant grain, sealant, matrix component for stretchable electronics, gasket, and/or seal comprises an article according to any preceding claim. In another aspect, a solid propellant comprises an article according to any preceding claim. As will be appreciated by the skilled artisan, incorporating an article according to any preceding claim into the aforementioned solid rocket propellant grain, sealant, matrix component for stretchable electronics, inflatable gripper, gasket, seal, hose, grip, responsive surface, shoe insole, lattice, dust shield, bushing, solid wheel, bumper, and/or shoe sole can be achieved via methods known to the skilled artisan including methods taught via U.S. Pat. No. 8,844,133 B2, USPA 2019/0390081 A1, U.S. Pat. No. 9,788,604 B2, USPA 2020/0032062 A1. Such teachings are sufficient to produce the final solid rocket propellant grain, sealant, matrix component for stretchable electronics, inflatable gripper, gasket, seal, hose, grip, responsive surface, shoe insole, lattice, dust shield, bushing, solid wheel, bumper, and/or shoe sole.

Process of Making Articles

Applicants disclose a process of making an article said process comprising casting, direct ink writing and/or VP 3D printing a composition comprising:
 a) a polydiene polymer, polydiene copolymer, hydrogenated vinyl ether-terminated polyolefin and/or vinyl ether terminated poly(tetramethylene oxide);
 b) a polythiol crosslinker selected from the group consisting of 1,4-butanedithiol; 4,5-bis(mercaptomethyl)-o-xylene; 1,4-benzenedithiol; 4,4'-biphenyldithiol; 1,3, 5-benzenetrithiol; 2,3-butanedithiol; 1,3-benzenedithiol; 1,10-decanedithiol; DL-dithiothreitol; dithioerythritol; 1,5-dimercaptonaphthalene; 3,6-dioxa-1,8-octanedithiol; 3,7-dithia-1,9-nonanedithiol; 1,2-ethanedithiol; 1,6-hexanedithiol; bis(2-mercaptoethyl) sulfide; 1,8-octanedithiol; 1,9-nonanedithiol 1,3-propanedithiol; 1,5-pentanedithiol; 4,4'-thiobisbenzenethiol; tetra(ethylene glycol) dithiol; 1,11-undecanedithiol; hexa(ethylene glycol) dithiol; 1,16-hexadecanedithiol and mixtures thereof, preferably said polythiol crosslinker is selected from the group consisting of 1,4-butanedithiol; 2,3-butanedithiol; 1,4-butanediol bis(thioglycolate); 1,10-decanedithiol; DL-dithiothreitol; dithioerythritol; 3,6-dioxa-1,8-octanedithiol; 3,7-dithia-1,9-nonanedithiol; 1,6-hexanedithiol; bis(2-mercaptoethyl) sulfide; 1,8-octanedithiol; 1,9-nonanedithiol 1,3-propanedithiol; 1,5-pentanedithiol; tetra(ethylene glycol) dithiol; 1,11-undecanedithiol; hexa(ethylene glycol) dithiol; 1,16-hexadecanedithiol and mixtures thereof; more preferably said polythiol crosslinker is selected from the group consisting of 1,4-butanedithiol; 2,3-butanedithiol; 1,10-decanedithiol; DL-dithiothreitol; dithioerythritol; 3,6-dioxa-1,8-octanedithiol; 3,7-dithia-1,9-nonanedithiol; 1,6-hexanedithiol; bis(2-mercaptoethyl) sulfide; 1,8-octanedithiol; 1,9-nonanedithiol; 1,5-pentanedithiol, tetra(ethylene glycol) dithiol; 1,11-undecanedithiol; hexa(ethylene glycol) dithiol; 1,16-hexadecanedithiol and mixtures thereof; most preferably said polythiol crosslinker is selected from the group consisting of 3,6-dioxa-1,8-octanedithiol; 1,9-nonanedithiol and mixtures thereof;

c) a UV initiator;
d) an optional adjunct;
e) an optional thermal initiator; and
f) an optional inhibitor subjecting said composition to UV light during said casting, direct ink writing and/or VP 3D printing and optionally thermally post curing said article. As will be appreciated by the skilled artisan, when the crosslinked polymer network comprising thioether crosslinks is derived from polymer having a functional of two, such as, vinyl ether terminated poly(tetramethylene oxide) the thiol of said thioether is derived from a polythiol having a functionality of greater than two.

Applicants disclose a process according to Paragraph 0021 wherein:
  a) said polymer is present in said composition, based on total composition weight at a level of from about 5 wt. % to about 99 wt. %; preferably said polymer is present in said composition, based on total composition mass at a level of from about 7 wt. % to about 92 wt. %; more preferably said polymer is present in said composition, based on total composition mass at a level of from about 10 wt. % to about 90 wt. %; most preferably said polymer is present in said composition, based on total composition mass at a level of from about 12 wt. % to about 85 wt. %;
  b) said polythiol crosslinker is present in said composition, based on total composition weight at a level of from about 0.1 wt. % to about 30 wt. %; preferably said polythiol crosslinker is present in said composition, based on total composition mass at a level of from about 2 wt. % to about 25 wt. %; more preferably said polythiol crosslinker is present in said composition, based on total composition mass at a level of from about 3 wt. % to about 20 wt. %; most preferably said polythiol crosslinker is present in said composition, based on total composition mass at a level of from about 4 wt. % to about 10 wt. %;
  c) said UV initiator is present in said composition, based on total composition weight at a level of from about 0.25 wt. % to about 15 wt. %; preferably said UV initiator is present in said composition, based on total composition mass at a level of from about 0.5 wt. % to about 10 wt. %; more preferably said UV initiator is present in said composition, based on total composition mass at a level of from about 0.75 wt. % to about 7.5 wt. %; most preferably said UV initiator is present in said composition, based on total composition mass at a level of from about 1 wt. % to about 5 wt. %;
  e) said optional inhibitor is present in said composition, based on total composition weight at a level of from about 0.01 wt. % to about 5 wt. %, preferably said optional inhibitor is present in said composition, based on total composition weight at a level of from about 0.1 wt. % to about 0.5 wt. %.
  f) said optional thermal initiator is present in said composition, based on total composition weight at a level of from about 0.25 wt. % to about 15 wt. %; preferably said thermal initiator is present in said composition, based on total composition weight at a level of from about 0.5 wt. % to about 10 wt. %; more preferably said thermal initiator is present in said composition, based on total composition weight at a level of from about 0.75 wt. % to about 7.5 wt. %; most preferably said thermal initiator is present in said composition, based on total composition weight at a level of from about 1 wt. % to about 5 wt. %; and
  g) said optional adjunct is present in said composition, based on total composition weight at a level of from about 0 wt. % to about 99 wt. %; preferably said one or more entrained adjuncts is present, based on said article mass percent, at a level of from about 5 wt. % to about 93 wt. %; more preferably said one or more entrained adjuncts is present, based on said article mass percent, at a level of from about 10 wt. % to about 91 wt. %; most preferably said one or more entrained adjuncts is present, based on said article mass percent, at a level of from about 15 wt. % to about 90 wt. %.

Applicants disclose a process according to Paragraphs 0021 through 0022 wherein said adjunct is present.

Applicants disclose a process according to Paragraphs 0021 through 0023 wherein:
  a) said polymer is selected from the group consisting of said polydiene polymer and said polydiene copolymer are selected from the group consisting of poly(1,3-butadiene), poly(1,4-pentadiene), polyisoprene, polychloroprene, polybromoprene, butadiene-acrylonitrile copolymer, and/or butadiene styrene copolymer; preferably said polymer is selected from poly(1,3-butadiene), polyisoprene, polychloroprene, and/or polybromoprene; more preferably said polymer is selected from poly(1,3-butadiene), polyisoprene, and/or polychloroprene; most preferably said polymer is selected from the group consisting of, poly(1,3-butadiene) and/or polyisoprene;
  b) said UV initiator is selected from the group consisting of Acetophenone; anisoin; anthraquinone; (benzene) tricarbonylchromium; benzil; benzoin; benzoin ethyl ether; benzoin isobutyl ether; benzoin methyl ether; benzophenone; 1-hydroxycyclohexyl phenyl ketone; 3,3',4,4'-benzophenonetetracarboxylic dianhydride; 4-benzoylbiphenyl; 2-benzyl-2-(dimethylamino)-4'- morpholinobutyrophenone; 4,4'-bis(diethylamino)benzophenone; 4,4'-bis(dimethylamino)benzophenone; camphorquinone; 2-chlorothioxanthen-9-one; (cumene)cyclopentadienyliron(II) hexafluorophosphate; dibenzosuberenone; 2,2-diethoxyacetophenone; 4,4'-dihydroxybenzophenone; 2,2-dimethoxy-2-phenylacetophenone; 4-(dimethylamino)benzophenone; 4,4'-dimethylbenzil; 2,5-dimethylbenzophenone; 3,4-dimethylbenzophenone; diphenyl(2,4,6-trimethylbenzoyl)phosphine oxide; 2-hydroxy-2-methylpropiophenone; 4'-ethoxyacetophenone; 2-ethylanthraquinone; ferrocene; 3'-hydroxyacetophenone; 4'-hydroxyacetophenone; 3-hydroxybenzophenone; 4-hydroxybenzophenone; 1-hydroxycyclohexyl phenyl ketone; 2-hydroxy-2-methylpropiophenone; 2-methylbenzophenone; 3-methylbenzophenone; methylbenzoylformate; 2-methyl-4'-(methylthio)-2-morpholinopropiophenone; phenanthrenequinone; 4'-phenoxyacetophenone; thioxanthen-9-one and mixtures thereof, preferably said initiator is selected from the group consisting of acetophenone; anisoin; anthraquinone; (benzene)tricarbonylchromium; benzil; benzoin; benzoin ethyl ether; benzoin isobutyl ether; benzoin methyl ether; benzophenone; 1-hydroxycyclohexyl phenyl ketone; 4-benzoylbiphenyl; 2-benzyl-2-(dimethylamino)-4'-morpholinobutyrophenone; 4,4'-bis(diethylamino)benzophenone; 4,4'-bis(dimethylamino)benzophenone; camphorquinone; 2-chlorothioxanthen-9-one; dibenzosuberenone; 2,2-diethoxyacetophenone; 4,4'-dihydroxybenzophenone; 2,2-dimethoxy-2-phenylacetophenone, 4-(dimethylamino)benzophenone, 4,4'-dimethylbenzil, 2,5-dimethylbenzophenone; 3,4-dimethylbenzophenone; diphenyl(2,4,6-trimethylbenzoyl)phosphine oxide; 2-hydroxy-2-methylpropiophenone; 4'-ethoxyacetophenone; 2-ethylanthraquinone; 3'-hydroxyacetophenone; 4'-hydroxyacetophenone; 3-hydroxybenzophenone; 4-hydroxybenzophenone; 1-hydroxycyclohexyl phenyl ketone; 2-hydroxy-2-methylpropiophenone; 2-methylbenzophenone; 3-methylbenzophenone; methylbenzoylformate; 2-methyl-4'-(methylthio)-2-morpholinopropiophenone; 4'-phenoxyacetophenone; thioxanthen-9-one and mixtures thereof; more preferably said UV initiator is selected from the group consisting of acetophenone; anisoin; anthraquinone; (benzene)tricarbonylchromium; benzoin ethyl ether; benzoin isobutyl ether; benzoin methyl ether; 4-benzoylbiphenyl; 2-benzyl-2-(dimethylamino)-4'-morpholinobutyrophenone; 4,4'-bis(diethylamino)benzophenone; 4,4'-bis(dimethylamino)benzophenone; camphorquinone; 2-chlorothioxanthen-9-one; dibenzosuberenone; 2,2-diethoxyacetophenone; 4,4'-dihydroxybenzophenone; 2,2-dimethoxy-2-phenylacetophenone; 4-(dimethylamino)benzophenone; 3,4-dimethylbenzophenone; diphenyl(2,4,6-trimethylbenzoyl)phosphine oxide; 2-hydroxy-2-methylpropiophenone; 2-ethylanthraquinone; 3'-hydroxyacetophenone; 4'-hydroxyacetophenone; 3-hydroxybenzophenone; 4-hydroxybenzophenone; 2-methyl-4'-(methylthio)-2-morpholinopropiophenone; 4'-phenoxyacetophenone; thioxanthen-9-one and mixtures thereof, most preferably said initiator is selected from the group consisting of 2,2-dimethoxy-2-phenylacetophenone; 4,4'-bis(diethylamino)benzophenone, 4,4'-bis(dimethylamino)benzophenone; camphorquinone, and mixtures thereof, c) said thermal initiator is selected from the group consisting of 2,3-dimethyl-2,3-diphenylbutane; tert-butyl hydroperoxide; tert-amyl hydroperoxide; cumyl hydroperoxide; 1,1,3,3-tetramethylbutyl hydroperoxide; isopropylcumyl hydroperoxide; isopropylcumyl hydroperoxide; 2,5-dimethyl-2,5-di(tert-butylperoxy)hexyne; 3,6,9-triethyl-3,6,9-trimethyl-1,4,7-triperoxonane; di(tert-butyl)peroxide; 2,5-dimethyl-2,5-di(tert-butylperoxy)hexane; di(tert-butylperoxy-isopropyl)benzene; tert-butyl cumyl peroxide; di-(tert-amyl)-peroxide; dicumyl peroxide; butyl 4,4-di(tert-butylperoxy)valerate; tert-butylperoxybenzoate; 2,2-di(tert-butylperoxy)butane; tert-amyl peroxy-benzoate; tert-butylperoxy-acetate; tert-butylperoxy-(2-ethylhexyl)carbonate; tert-butylperoxy isopropyl carbonate; tert-butyl peroxy-3,5,5-trimethyl-hexanoate; 1,1-di(tert-butylperoxy)cyclohexane; tert-amyl peroxyacetate; tert-amylperoxy-(2-ethylhexyl)carbonate; 1,1-di(tert-butylperoxy)-3,5,5-trimethylcyclohexane; 1,1-di(tert-amylperoxy)cyclohexane; tert-butyl-monoperoxy-maleate; 1,1'-azodi(hexahydrobenzonitrile); tert-butyl peroxy-isobutyrate; tert-butyl peroxydiethylacetate; tert-butyl peroxy-2-ethylhexanoate; dibenzoyl peroxide; tert-amyl peroxy-2-ethylhexanoate; di(4-methylbenzoyl)peroxide; 1,1,3,3-tetramethylbutyl peroxy-2-ethylhexanoate; 2,5-dimethyl-2,5-di(2-ethylhexanoylperoxy)hexane; 2,2'-azodi(2-methylbutyronitrile); 2,2'-azodi(isobutyronitrile); didecanoyl peroxide; dilauroyl peroxide; di(3,5,5-trimethylhexanoyl) peroxide; tert-amyl peroxypivalate; tert-butyl peroxyneoheptanoate; 1,1,3,3-tetramethylbutyl peroxypivalate; tert-butyl peroxypivalate; dicetyl peroxydicarbonate; dimyristyl peroxydicarbonate; di(2-ethylhexyl) peroxydicarbonate; di(4-tert-butylcyclohexyl) peroxydicarbonate; diisopropyl peroxydicarbonate; tert-butyl peroxyneodecanoate; di-sec-butyl peroxydicarbonate; tert-amyl peroxyneodecanoate; cumyl peroxyneoheptanoate; di(3-methoxybutyl) peroxydicarbonate; 1,1,3,3-tetramethylbutyl peroxyneodecanoate; cumyl peroxyneodecanoate; diisobutyryl peroxide and mixtures thereof; preferably said initiator is selected from the group consisting of 2,3-dimethyl-2,3-diphenylbutane; 2,5-dimethyl-2,5-di(tert-butylperoxy)hexyne; 3,6,9-triethyl-3,6,9-trimethyl-1,4,7-triperoxonane; di(tert-butyl)peroxide; 2,5-dimethyl-2,5-di(tert-butylperoxy)hexane; di(tert-butylperoxy-isopropyl)benzene; tert-butyl cumyl peroxide; di-(tert-amyl)-peroxide; dicumyl peroxide; butyl 4,4-di(tert-butylperoxy)valerate; 2,2-di(tert-butylperoxy)butane; tert-butylperoxy-acetate; tert-butylperoxy-(2-ethylhexyl)carbonate; tert-butylperoxy isopropyl carbonate; tert-butyl peroxy-3,5,5-trimethyl-hexanoate; 1,1-di(tert-butylperoxy)cyclohexane; tert-amyl peroxyacetate; tert-amylperoxy-(2-ethylhexyl)carbonate; 1,1-di(tert-butylperoxy)-3,5,5-trimethylcyclohexane; 1,1-di(tert-amylperoxy)cyclohexane; tert-butyl-monoperoxy-maleate; tert-butyl peroxy-isobutyrate; tert-butyl peroxydiethylacetate; tert-butyl peroxy-2-ethylhexanoate; tert-amyl peroxy-2-ethylhexanoate; di(4-methylbenzoyl)peroxide; 1,1,3,3-tetramethylbutyl peroxy-2-ethylhexanoate; 2,5-dimethyl-2,5-di(2-ethylhexanoylperoxy)hexane; didecanoyl peroxide; dilauroyl peroxide; di(3,5,5-trimethylhexanoyl) peroxide; tert-amyl peroxypivalate; tert-butyl peroxyneoheptanoate; 1,1,3,3-tetramethylbutyl peroxypivalate; tert-butyl peroxypivalate; dicetyl peroxydicarbonate; dimyristyl peroxydicarbonate; di(2-ethylhexyl) peroxydicarbonate; di(4-tert-butylcyclohexyl) peroxydicarbonate; diisopropyl peroxydicarbonate; tert-butyl peroxyneodecanoate; di-sec-butyl peroxydicarbonate; tert-amyl peroxyneodecanoate; cumyl peroxyneoheptanoate; di(3-methoxybutyl) peroxydicarbonate; 1,1,3,3-tetramethylbutyl peroxyneodecanoate; cumyl peroxyneodecanoate; diisobutyryl peroxide and mixtures thereof; more preferably said thermal initiator is selected from the group consisting of tert-butylperoxy-(2-ethylhexyl)carbonate; tert-butylperoxy isopropyl carbonate; tert-butyl peroxy-3,5,5-trimethyl-hexanoate; 1,1-di(tert-butylperoxy)cyclohexane; tert-amyl peroxyacetate; tert-amylperoxy-(2-ethylhexyl)carbonate; 1,1-di(tert-butylperoxy)-3,5,5-trimethylcyclohexane; 1,1-di(tert-amylperoxy)cyclohexane; tert-butyl-monoperoxy-maleate; tert-butyl peroxy-isobutyrate; tert-butyl peroxydiethylacetate; tert-butyl peroxy-2-ethylhexanoate; tert-amyl peroxy-2-ethylhexanoate; di(4-methylbenzoyl)peroxide; 1,1,3,3-tetramethylbutyl peroxy-2-ethylhexanoate; 2,5-dimethyl-2,5-di(2-ethylhexanoylperoxy)hexane; didecanoyl peroxide; dilauroyl peroxide; di(3,5,5-trimethylhexanoyl) peroxide; tert-amyl peroxypivalate; tert-butyl peroxyneoheptanoate; 1,1,3,3-tetramethylbutyl peroxypivalate; tert-butyl peroxypivalate; dicetyl peroxydicarbonate; dimyristyl peroxydicarbonate; di(2-ethylhexyl) peroxydicarbonate; di(4-tert-butylcyclohexyl) peroxydicarbonate; diisopropyl peroxydicarbonate; tert-butyl peroxyneodecanoate; di-sec-butyl peroxydicarbonate; tert-amyl peroxyneodecanoate; cumyl peroxyneoheptanoate; di(3-methoxybutyl) peroxydicarbonate; 1,1,3,3-tetramethylbutyl peroxyneodecanoate; cumyl peroxyneodecanoate; diisobutyryl peroxide and mixtures thereof; most preferably said initiator is selected from the group consisting of tert-butylperoxy-(2-ethylhexyl)carbonate, dilauroyl peroxide and mixtures thereof;

d) said optional inhibitor is selected from the group consisting of phenothiazine, quinone monomethyl ether, butylated hydroxytoluene, hydroquinone and mixtures thereof; and e) said optional adjunct is selected from the group consisting of acetamide, acetyltributylcitrate, benzyl benzoate, benzyl butyl phthalate, bis(2-ethylhexyl) adipate, bis(2-ethylhexyl) phthalate, centralite, 1,2-cyclohexane dicarboxylic acid diisononyl ester, dibutyl phthalate, dibutyl sebacate, diethylene glycol dinitrate, diisobutyl phthalate, diisodecyl phthalate, diisononyl phthalate, dimethyl adipate, dimethyl methylphosphonate, 2,4-dinitrotoluene, dioctyl adipate, dioctyl sebacate, dioctyl terephthalate, dipropylene glycol, biobased oils, epoxidized soybean oil, fatty acids (stearic, lauryl, linoleic, oleic), soybean oil, ethyl butyrate, ethylene carbonate, furoin, linseed oil, maleic acid dibutyl ester, naphtha, neopentyl glycol, paraffin, polybutene, polychlorinated biphenyl, polychlorinated terphenyl, propylene carbonate, tris(1-(2-methyl)) aziridinyl phosphine oxide, trimesoyl-1-(2-ethyl)aziridine, tetraethylenepentamine acrylonitrile glycidol adduct, partially cyanoacrylated tetraethylenepentamine, isophthaloyl-bis(methyl-ethyleneimide), triacetin, tributyl phosphate, tricresyl phosphate, triethyl phosphate, triethylene glycol dinitrate, trimethylolethane trinitrate, metal oxides (alumina, iron oxide, titanium dioxide, zirconium oxide, zinc oxide), talc, glass (both fibers and beads), metal carbonates (including magnesium and calcium), salts (nitrates, perchlorates, sulfates), metals (magnesium, aluminum, iron, silver, copper, gold), carbon black, carbon nanotubes, graphene, graphene oxide, clays, cellulose, nanocellulose, precipitated silica, fumed silica, polyhedral oligomeric silsesquioxane, and mixtures thereof, preferably said one or more entrained adjuncts being selected from the group consisting of acetyltributylcitrate, benzyl benzoate, benzyl butyl phthalate, bis(2-ethylhexyl) adipate, bis(2-ethylhexyl) phthalate, centralite, 1,2-cyclohexane dicarboxylic acid diisononyl ester, dibutyl phthalate, dibutyl sebacate, diethylene glycol dinitrate, diisobutyl phthalate, diisodecyl phthalate, diisononyl phthalate, dimethyl adipate, dimethyl methylphosphonate, 2,4-dinitrotoluene, dioctyl adipate, dioctyl sebacate, dioctyl terephthalate, dipropylene glycol, biobased oils, ethyl butyrate, ethylene carbonate, furoin, maleic acid dibutyl ester, neopentyl glycol, polybutene, propylene carbonate, triacetin, tributyl phosphate, tricresyl phosphate, triethyl phosphate, triethylene glycol dinitrate, trimethylolethane trinitrate, metal oxides, metal carbonates, salts, metals, carbon black, clays, cellulose, nanocellulose, precipitated silica, fumed silica, and mixtures thereof, more preferably said one or more entrained adjuncts being selected from the group consisting of bis(2-ethylhexyl) adipate, bis(2-ethylhexyl) phthalate, dibutyl phthalate, dibutyl sebacate, diisobutyl phthalate, diisodecyl phthalate, diisononyl phthalate, dimethyl adipate, dioctyl adipate, dioctyl sebacate, dioctyl terephthalate, dipropylene glycol, ethyl butyrate, ethylene carbonate, furoin, maleic acid dibutyl ester, neopentyl glycol, polybutene, propylene carbonate, metal oxides, salts, metals, carbon black, cellulose, nanocellulose, fumed silica, and mixtures thereof, most preferably said one or more entrained adjuncts being selected from the group consisting of bis(2-ethylhexyl) adipate, dibutyl sebacate, dimethyl adipate, dioctyl adipate, dioctyl sebacate, fumed silica, metals, salts, and mixtures thereof.

Applicants disclose a process according to Paragraphs 0021 through 0024 said process comprising casting said composition and optionally thermally post curing said article.

Applicants disclose a process according to Paragraphs 0021 through 0024 wherein said composition comprises, based on total composition weight percent of from about 1 wt. % to 30 wt. % of an adjunct selected from the group consisting of fumed silica, nanocellulose, clay, carbon black, and said process comprises direct ink writing said composition, preferably said composition comprises about 3 wt. % to 25 wt. % of an adjunct selected from the group consisting of fumed silica, nanocellulose, clay, carbon black, and said process comprises direct ink writing said composition, more preferably said composition comprises about 5 wt. % to 15 wt. % of an adjunct selected from the group consisting of fumed silica, nanocellulose, clay, carbon black, and said process comprises direct ink writing said composition, most preferably said composition comprises 8 wt. % to 12 wt. % of an adjunct selected from the group consisting of fumed silica, nanocellulose, clay, carbon black, and said process comprises direct ink writing said composition.

Applicants disclose a process according to Paragraphs 0021 through 0024 said process comprising VP 3D printing said composition and optionally thermally post curing said article.

Applicants disclose a process according to Paragraphs 0021 through 0027 wherein said thermal initiator is present in said composition, based on total composition weight at a level of from about 0.25 wt. % to about 15 wt. %; preferably said thermal initiator is present in said composition, based on total composition weight at a level of from about 0.5 wt. % to about 10 wt. %; more preferably said thermal initiator is present in said composition, based on total composition weight at a level of from about 0.75 wt. % to about 7.5 wt. %; most preferably said thermal initiator is present in said composition, based on total composition weight at a level of from about 1 wt. % to about 5 wt. %; said process comprising thermally post curing said article, preferably said thermally post curing comprises heating said article in an oven between 40° C. and 150° C. for between 1 min. and 1 week; more preferably said thermally post curing comprises heating said article in an oven between 50° C. and 120° C. for between 15 minutes and 24 hours, most preferably said thermally post curing comprises heating said article in an oven between 60° C. and 100° C. for between 1 hours and 4 hours; preferably said thermal initiator is selected from the group consisting of 2,3-dimethyl-2,3-diphenylbutane; tert-butyl hydroperoxide; tert-amyl hydroperoxide; cumyl hydroperoxide; 1,1,3,3-tetramethylbutyl hydroperoxide; isopropylcumyl hydroperoxide; isopropylcumyl hydroperoxide; 2,5-dimethyl-2,5-di(tert-butylperoxy)hexyne; 3,6,9-triethyl-3,6,9-trimethyl-1,4,7-triperoxonane; di(tert-butyl) peroxide; 2,5-dimethyl-2,5-di(tert-butylperoxy)hexane; di(tert-butylperoxy-isopropyl)benzene; tert-butyl cumyl peroxide; di-(tert-amyl)-peroxide; dicumyl peroxide; butyl 4,4-di(tert-butylperoxy)valerate; tert-butylperoxybenzoate; 2,2-di(tert-butylperoxy)butane; tert-amyl peroxy-benzoate; tert-butylperoxy-acetate; tert-butylperoxy-(2-ethylhexyl) carbonate; tert-butylperoxy isopropyl carbonate; tert-butyl peroxy-3,5,5-trimethyl-hexanoate; 1,1-di(tert-butylperoxy) cyclohexane; tert-amyl peroxyacetate; tert-amylperoxy-(2-ethylhexyl)carbonate; 1,1-di(tert-butylperoxy)-3,5,5-trimethylcyclohexane; 1,1-di(tert-amylperoxy)cyclohexane; tert-butyl-monoperoxy-maleate; 1,1'-azodi(hexahydrobenzonitrile); tert-butyl peroxy-isobutyrate; tert-butyl peroxydiethylacetate; tert-butyl peroxy-2-ethylhexanoate; dibenzoyl peroxide; tert-amyl peroxy-2-ethylhexanoate; di(4-methylbenzoyl)peroxide; 1,1,3,3-tetramethylbutyl peroxy-2-ethyl-hexanoate; 2,5-dimethyl-2,5-di(2-ethylhexanoylperoxy)hexane; 2,2'-azodi(2-methylbutyronitrile); 2,2'-azodi(isobutyronitrile); didecanoyl peroxide; dilauroyl peroxide; di(3,5,5-trimethylhexanoyl) peroxide; tert-amyl peroxypivalate; tert-butyl peroxyneoheptanoate; 1,1,3,3-tetramethylbutyl peroxypivalate; tert-butyl peroxypivalate; dicetyl peroxydicarbonate; dimyristyl peroxydicarbonate; di(2-ethylhexyl) peroxydicarbonate; di(4-tert-butylcyclohexyl) peroxydicarbonate; diisopropyl peroxydicarbonate; tert-butyl peroxyneodecanoate; di-sec-butyl peroxydicarbonate; tert-amyl peroxyneodecanoate; cumyl peroxyneoheptanoate; di(3-methoxybutyl) peroxydicarbonate; 1,1,3,3-tetramethylbutyl peroxyneodecanoate; cumyl peroxyneodecanoate; diisobutyryl peroxide and mixtures thereof; more preferably said initiator is selected from the group consisting of 2,3-dimethyl-2,3-diphenylbutane; 2,5-dimethyl-2,5-di(tert-butylperoxy)hexyne; 3,6,9-triethyl-3,6,9-trimethyl-1,4,7-triperoxonane; di(tert-butyl)peroxide; 2,5-dimethyl-2,5-di(tert-butylperoxy)hexane; di(tert-butylperoxy-isopropyl)benzene; tert-butyl cumyl peroxide; di-(tert-amyl)-peroxide; dicumyl peroxide; butyl 4,4-di(tert-butylperoxy)valerate; 2,2-di(tert-butylperoxy)butane; tert-butylperoxy-acetate; tert-butylperoxy-(2-ethylhexyl)carbonate; tert-butylperoxy isopropyl carbonate; tert-butyl peroxy-3,5,5-trimethyl-hexanoate; 1,1-di(tert-butylperoxy)cyclohexane; tert-amyl peroxyacetate; tert-amylperoxy-(2-ethylhexyl)carbonate; 1,1-di(tert-butylperoxy)-3,5,5-trimethylcyclohexane; 1,1-di(tert-amylperoxy)cyclohexane; tert-butyl-monoperoxy-maleate; tert-butyl peroxy-isobutyrate; tert-butyl peroxydiethylacetate; tert-butyl peroxy-2-ethylhexanoate; tert-amyl peroxy-2-ethylhexanoate; di(4-methylbenzoyl)peroxide; 1,1,3,3-tetramethylbutyl peroxy-2-ethylhexanoate; 2,5-dimethyl-2,5-di(2-ethylhexanoylperoxy)hexane; didecanoyl peroxide; dilauroyl peroxide; di(3,5,5-trimethylhexanoyl) peroxide; tert-amyl peroxypivalate; tert-butyl peroxyneoheptanoate; 1,1,3,3-tetramethylbutyl peroxypivalate; tert-butyl peroxypivalate; dicetyl peroxydicarbonate; dimyristyl peroxydicarbonate; di(2-ethylhexyl) peroxydicarbonate; di(4-tert-butylcyclohexyl) peroxydicarbonate; diisopropyl peroxydicarbonate; tert-butyl peroxyneodecanoate; di-sec-butyl peroxydicarbonate; tert-amyl peroxyneodecanoate; cumyl peroxyneoheptanoate; di(3-methoxybutyl) peroxydicarbonate; 1,1,3,3-tetramethylbutyl peroxyneodecanoate; cumyl peroxyneodecanoate; diisobutyryl peroxide and mixtures thereof, more preferably said thermal initiator is selected from the group consisting of tert-butylperoxy-(2-ethylhexyl)carbonate; tert-butylperoxy isopropyl carbonate; tert-butyl peroxy-3,5,5-trimethyl-hexanoate; 1,1-di(tert-butylperoxy)cyclohexane; tert-amyl peroxyacetate; tert-amylperoxy-(2-ethylhexyl)carbonate; 1,1-di(tert-butylperoxy)-3,5,5-trimethylcyclohexane; 1,1-di(tert-amylperoxy)cyclohexane; tert-butyl-monoperoxy-maleate; tert-butyl peroxy-isobutyrate; tert-butyl peroxydiethylacetate; tert-butyl peroxy-2-ethylhexanoate; tert-amyl peroxy-2-ethylhexanoate; di(4-methylbenzoyl)peroxide; 1,1,3,3-tetramethylbutyl peroxy-2-ethylhexanoate; 2,5-dimethyl-2,5-di(2-ethylhexanoylperoxy)hexane; didecanoyl peroxide; dilauroyl peroxide; di(3,5,5-trimethylhexanoyl) peroxide; tert-amyl peroxypivalate; tert-butyl peroxyneoheptanoate; 1,1,3,3-tetramethylbutyl peroxypivalate; tert-butyl peroxypivalate; dicetyl peroxydicarbonate; dimyristyl peroxydicarbonate; di(2-ethylhexyl) peroxydicarbonate; di(4-tert-butylcyclohexyl) peroxydicarbonate; diisopropyl peroxydicarbonate; tert-butyl peroxyneodecanoate; di-sec-butyl peroxydicarbonate; tert-amyl peroxyneodecanoate; cumyl peroxyneoheptanoate; di(3-methoxybutyl) peroxydicarbonate; 1,1,3,3-tetramethylbutyl peroxyneodecanoate; cumyl peroxyneodecanoate; diisobutyryl peroxide and mixtures thereof, most preferably said initiator is selected from the group consisting of tert-butylperoxy-(2-ethylhexyl) carbonate, dilauroyl peroxide and mixtures thereof.

Applicants disclose a process according to Paragraphs 0021 through 0028 wherein, said polymer network is derived from a linear polydiene polymer, a linear polydiene copolymer, hydrogenated vinyl ether-terminated polyolefin and/or vinyl ether terminated poly(tetramethylene oxide), preferably said linear polydiene polymer and said linear polydiene copolymer are selected from the group consisting of linear poly(1,3-butadiene), linear poly(1,4-pentadiene), linear polyisoprene, linear polychloroprene, linear polybromoprene, linear butadiene-acrylonitrile copolymer, and/or linear butadiene styrene copolymer; more preferably said polymer is selected from linear poly(1,3-butadiene), linear polyisoprene, linear polychloroprene, and/or linear polybromoprene; even more preferably said polymer is selected from linear poly(1,3-butadiene), linear polyisoprene, and/or linear polychloroprene; most preferably said polymer is selected from the group consisting of, linear poly(1,3-butadiene) and/or linear polyisoprene. The advantages of using the aforementioned linear polymers include but are not limited to lower cost than branched hydroxyl-terminated polybutadiene; greater flexibility in resin choice with regards to molecular weight, viscosity, glass transition temperature, and polymer microstructure (cis, trans, and vinyl content); easier processing due to lower viscosity; and more flexibility in choice of resin properties like modulus, that can be tuned through formulation.

A process of making an article said process comprising casting, and/or direct ink writing a composition comprising:
- a) a polydiene polymer, polydiene copolymer, hydrogenated vinyl ether-terminated polyolefin and/or vinyl ether terminated poly(tetramethylene oxide);
- b) a polythiol crosslinker selected from the group consisting of 1,4-butanedithiol; 4,5-bis(mercaptomethyl)-o-xylene; 1,4-benzenedithiol; 4,4'-biphenyldithiol; 1,3,5-benzenetrithiol; 2,3-butanedithiol; 1,3-benzenedithiol; 1,10-decanedithiol; DL-dithiothreitol; dithioerythritol; 1,5-dimercaptonaphthalene; 3,6-dioxa-1,8-octanedithiol; 3,7-dithia-1,9-nonanedithiol; 1,2-ethanedithiol; 1,6-hexanedithiol; bis(2-mercaptoethyl) sulfide; 1,8-octanedithiol; 1,9-nonanedithiol 1,3-propanedithiol; 1,5-pentanedithiol; 4,4'-thiobisbenzenethiol; tetra(ethylene glycol) dithiol; 1,11-undecanedithiol; hexa(ethylene glycol) dithiol; 1,16-hexadecanedithiol and mixtures thereof, preferably said polythiol crosslinker is selected from the group consisting of 1,4-butanedithiol; 2,3-butanedithiol; 1,4-butanediol bis(thioglycolate); 1,10-decanedithiol; DL-dithiothreitol; dithioerythritol; 3,6-dioxa-1,8-octanedithiol; 3,7-dithia-1,9-nonanedithiol; 1,2-ethanedithiol; 1,6-hexanedithiol; bis(2-mercaptoethyl) sulfide; 1,8-octanedithiol; 1,9-nonanedithiol 1,3-propanedithiol; 1,5-pentanedithiol; tetra(ethylene glycol) dithiol; 1,11-undecanedithiol; hexa(ethylene glycol) dithiol; 1,16-hexadecanedithiol and mixtures thereof; more preferably said polythiol crosslinker is selected from the group consisting of 1,4-butanedithiol; 2,3-butanedithiol; 1,10-decanedithiol; DL-dithiothreitol; dithioerythritol; 3,6-dioxa-1,8-octanedithiol; 3,7-dithia-1,9-nonanedithiol; 1,6-hexanedithiol; bis(2-mercaptoethyl) sulfide; 1,8-octanedithiol; 1,9-nonanedithiol; 1,5-pentanedithiol, tetra(ethylene glycol) dithiol; 1,11-undecanedithiol; hexa(ethylene glycol) dithiol; 1,16-hexadecanedithiol and mixtures thereof; most preferably said polythiol crosslinker is selected from the group consisting of 3,6-dioxa-1,8-octanedithiol; 1,9-nonanedithiol and mixtures thereof;
- c) a thermal initiator;
- d) an optional inhibitor; and
- e) an optional adjunct;

subjecting said composition to thermal energy during said casting and/or direct ink writing and optionally thermally post curing said article. As will be appreciated by the skilled artisan, when the crosslinked polymer network comprising thioether crosslinks is derived from polymer having a functional of two, such as, vinyl ether terminated poly(tetramethylene oxide) the thiol of said thioether is derived from a polythiol having a functionality of greater than two.

A process according to Paragraph 0030 wherein:
- a) said polymer is present in said composition, based on total composition weight at a level of from about 5 wt. % to about 99 wt. %; preferably said polymer is present in said composition, based on total composition weight at a level of from about 7 wt % to about 92 wt. %; more preferably said polymer is present in said composition, based on total composition weight at a level of from about 10 wt. % to about 90 wt. %; most preferably said polymer is present in said composition, based on total composition weight at a level of from about 12 wt. % to about 85 wt. %;
- b) said polythiol crosslinker is present in said composition, based on total composition weight at a level of from about 0.1 wt. % to about 30 wt. %; preferably said polythiol crosslinker is present in said composition, based on total composition weight at a level of from about 2 wt. % to about 25 wt. %; more preferably said polythiol crosslinker is present in said composition, based on total composition weight at a level of from about 3 wt. % to about 20 wt. %; most preferably said polythiol crosslinker is present in said composition, based on total composition weight at a level of from about 4 wt. % to about 10 wt. %;
- c) said thermal initiator is present in said composition, based on total composition weight at a level of from about 0.25 wt. % to about 15 wt. %; preferably said thermal initiator is present in said composition, based on total composition weight at a level of from about 0.5 wt. % to about 10 wt. %; more preferably said thermal initiator is present in said composition, based on total composition weight at a level of from about 0.75 wt. % to about 7.5 wt. %; most preferably said thermal initiator is present in said composition, based on total composition weight at a level of from about 1 wt. % to about 5 wt. %;
- e) said optional inhibitor is present in said composition, based on total composition weight at a level of from about 0.01 wt. % to about 5 wt. %, preferably said optional inhibitor is present in said composition, based on total composition weight at a level of from about 0.1 wt. % to about 0.5 wt. %; and
- f) said optional adjunct is present in said composition, based on total composition weight at a level of from about 0 wt. % to about 99 wt. %; preferably said one or more entrained adjuncts is present, based on said article weight percent, at a level of from about 5 wt. % to about 93 wt. %; more preferably said one or more entrained adjuncts is present, based on said article weight percent, at a level of from about 10 wt. % to about 91 wt. %; most preferably said one or more entrained adjuncts is present, based on said article weight percent, at a level of from about 15 wt. % to about 90 wt. %.

A process according to Paragraphs 0030 through 0031 wherein said adjunct is present.

A process according to Paragraphs 0030 through 0032 wherein:
- a) said polymer is selected from the group consisting of said polydiene polymer and said polydiene copolymer are selected from the group consisting of poly(1,3-butadiene), poly(1,4-pentadiene), polyisoprene, polychloroprene, polybromoprene, butadiene-acrylonitrile copolymer, and/or butadiene styrene copolymer; preferably said polymer is selected from poly(1,3-butadiene), polyisoprene, polychloroprene, and/or polybromoprene; more preferably said polymer is selected from poly(1,3-butadiene), polyisoprene, and/or polychloroprene; most preferably said polymer is selected from the group consisting of, poly(1,3-butadiene) and/or polyisoprene;
- b) said thermal initiator is selected from the group consisting of 2,3-dimethyl-2,3-diphenylbutane; tert-butyl hydroperoxide; tert-amyl hydroperoxide; cumyl hydroperoxide; 1,1,3,3-tetramethylbutyl hydroperoxide; isopropylcumyl hydroperoxide; isopropylcumyl hydroperoxide; 2,5-dimethyl-2,5-di(tert-butylperoxy) hexyne; 3,6,9-triethyl-3,6,9-trimethyl-1,4,7-triperoxonane; di(tert-butyl)peroxide; 2,5-dimethyl-2,5-di(tert-butylperoxy)hexane; di(tert-butylperoxy-isopropyl)

benzene; tert-butyl cumyl peroxide; di-(tert-amyl)-peroxide; dicumyl peroxide; butyl 4,4-di(tert-butylperoxy)valerate; tert-butylperoxybenzoate; 2,2-di(tert-butylperoxy)butane; tert-amyl peroxy-benzoate; tert-butylperoxy-acetate; tert-butylperoxy-(2-ethylhexyl)carbonate; tert-butylperoxy isopropyl carbonate; tert-butyl peroxy-3,5,5-trimethyl-hexanoate; 1,1-di(tert-butylperoxy)cyclohexane; tert-amyl peroxyacetate; tert-amylperoxy-(2-ethylhexyl)carbonate; 1,1-di(tert-butylperoxy)-3,5,5-trimethylcyclohexane; 1,1-di(tert-amylperoxy)cyclohexane; tert-butyl-monoperoxy-maleate; 1,1'-azodi(hexahydrobenzonitrile); tert-butyl peroxy-isobutyrate; tert-butyl peroxydiethylacetate; tert-butyl peroxy-2-ethylhexanoate; dibenzoyl peroxide; tert-amyl peroxy-2-ethylhexanoate; di(4-methylbenzoyl)peroxide; 1,1,3,3-tetramethylbutyl peroxy-2-ethylhexanoate; 2,5-dimethyl-2,5-di(2-ethylhexanoylperoxy)hexane; 2,2'-azodi(2-methylbutyronitrile); 2,2'-azodi(isobutyronitrile); didecanoyl peroxide; dilauroyl peroxide; di(3,5,5-trimethylhexanoyl) peroxide; tert-amyl peroxypivalate; tert-butyl peroxyneoheptanoate; 1,1,3,3-tetramethylbutyl peroxypivalate; tert-butyl peroxypivalate; dicetyl peroxydicarbonate; dimyristyl peroxydicarbonate; di(2-ethylhexyl) peroxydicarbonate; di(4-tert-butylcyclohexyl) peroxydicarbonate; diisopropyl peroxydicarbonate; tert-butyl peroxyneodecanoate; di-sec-butyl peroxydicarbonate; tert-amyl peroxyneodecanoate; cumyl peroxyneoheptanoate; di(3-methoxybutyl) peroxydicarbonate; 1,1,3,3-tetramethylbutyl peroxyneodecanoate; cumyl peroxyneodecanoate; diisobutyryl peroxide and mixtures thereof; preferably said initiator is selected from the group consisting of 2,3-dimethyl-2,3-diphenylbutane; 2,5-dimethyl-2,5-di(tert-butylperoxy)hexyne; 3,6,9-triethyl-3,6,9-trimethyl-1,4,7-triperoxonane; di(tert-butyl)peroxide; 2,5-dimethyl-2,5-di(tert-butylperoxy)hexane; di(tert-butylperoxy-isopropyl)benzene; tert-butyl cumyl peroxide; di-(tert-amyl)-peroxide; dicumyl peroxide; butyl 4,4-di(tert-butylperoxy)valerate; 2,2-di(tert-butylperoxy)butane; tert-butylperoxy-acetate; tert-butylperoxy-(2-ethylhexyl)carbonate; tert-butylperoxy isopropyl carbonate; tert-butyl peroxy-3,5,5-trimethyl-hexanoate; 1,1-di(tert-butylperoxy)cyclohexane; tert-amyl peroxyacetate; tert-amylperoxy-(2-ethylhexyl)carbonate; 1,1-di(tert-butylperoxy)-3,5,5-trimethylcyclohexane; 1,1-di(tert-amylperoxy)cyclohexane; tert-butyl-monoperoxy-maleate; tert-butyl peroxy-isobutyrate; tert-butyl peroxydiethylacetate; tert-butyl peroxy-2-ethylhexanoate; tert-amyl peroxy-2-ethylhexanoate; di(4-methylbenzoyl)peroxide; 1,1,3,3-tetramethylbutyl peroxy-2-ethylhexanoate; 2,5-dimethyl-2,5-di(2-ethylhexanoylperoxy)hexane; didecanoyl peroxide; dilauroyl peroxide; di(3,5,5-trimethylhexanoyl) peroxide; tert-amyl peroxypivalate; tert-butyl peroxyneoheptanoate; 1,1,3,3-tetramethylbutyl peroxypivalate; tert-butyl peroxypivalate; dicetyl peroxydicarbonate; dimyristyl peroxydicarbonate; di(2-ethylhexyl) peroxydicarbonate; di(4-tert-butylcyclohexyl) peroxydicarbonate; diisopropyl peroxydicarbonate; tert-butyl peroxyneodecanoate; di-sec-butyl peroxydicarbonate; tert-amyl peroxyneodecanoate; cumyl peroxyneoheptanoate; di(3-methoxybutyl) peroxydicarbonate; 1,1,3,3-tetramethylbutyl peroxyneodecanoate; cumyl peroxyneodecanoate; diisobutyryl peroxide and mixtures thereof; more preferably said thermal initiator is selected from the group consisting of tert-butylperoxy-(2-ethylhexyl)carbonate; tert-butylperoxy isopropyl carbonate; tert-butyl peroxy-3,5,5-trimethyl-hexanoate; 1,1-di(tert-butylperoxy)cyclohexane; tert-amyl peroxyacetate; tert-amylperoxy-(2-ethylhexyl)carbonate; 1,1-di(tert-butylperoxy)-3,5,5-trimethylcyclohexane; 1,1-di(tert-amylperoxy)cyclohexane; tert-butyl-monoperoxy-maleate; tert-butyl peroxy-isobutyrate; tert-butyl peroxydiethylacetate; tert-butyl peroxy-2-ethylhexanoate; tert-amyl peroxy-2-ethylhexanoate; di(4-methylbenzoyl)peroxide; 1,1,3,3-tetramethylbutyl peroxy-2-ethylhexanoate; 2,5-dimethyl-2,5-di(2-ethylhexanoylperoxy)hexane; didecanoyl peroxide; dilauroyl peroxide; di(3,5,5-trimethylhexanoyl) peroxide; tert-amyl peroxypivalate; tert-butyl peroxyneoheptanoate; 1,1,3,3-tetramethylbutyl peroxypivalate; tert-butyl peroxypivalate; dicetyl peroxydicarbonate; dimyristyl peroxydicarbonate; di(2-ethylhexyl) peroxydicarbonate; di(4-tert-butylcyclohexyl) peroxydicarbonate; diisopropyl peroxydicarbonate; tert-butyl peroxyneodecanoate; di-sec-butyl peroxydicarbonate; tert-amyl peroxyneodecanoate; cumyl peroxyneoheptanoate; di(3-methoxybutyl) peroxydicarbonate; 1,1,3,3-tetramethylbutyl peroxyneodecanoate; cumyl peroxyneodecanoate; diisobutyryl peroxide and mixtures thereof; most preferably said initiator is selected from the group consisting of tert-butylperoxy-(2-ethylhexyl)carbonate, dilauroyl peroxide and mixtures thereof;

c) said optional inhibitor is selected from the group consisting of phenothiazine, quinone monomethyl ether, butylated hydroxytoluene, hydroquinone and mixtures thereof; and d) said optional adjunct is selected from the group consisting of acetamide, acetyltributylcitrate, benzyl benzoate, benzyl butyl phthalate, bis(2-ethylhexyl) adipate, bis(2-ethylhexyl) phthalate, centralite, 1,2-cyclohexane dicarboxylic acid diisononyl ester, dibutyl phthalate, dibutyl sebacate, diethylene glycol dinitrate, diisobutyl phthalate, diisodecyl phthalate, diisononyl phthalate, dimethyl adipate, dimethyl methylphosphonate, 2,4-dinitrotoluene, dioctyl adipate, dioctyl sebacate, dioctyl terephthalate, dipropylene glycol, biobased oils, epoxidized soybean oil, fatty acids (stearic, lauryl, linoleic, oleic), soybean oil, ethyl butyrate, ethylene carbonate, furoin, linseed oil, maleic acid dibutyl ester, naphtha, neopentyl glycol, paraffin, polybutene, polychlorinated biphenyl, polychlorinated terphenyl, propylene carbonate, tris(1-(2-methyl))aziridinyl phosphine oxide, trimesoyl-1-(2-ethyl)aziridine, tetraethylenepentamine acrylonitrile glycidol adduct, partially cyanoacrylated tetraethylenepentamine, isophthaloyl-bis(methyl-ethyleneimide), triacetin, tributyl phosphate, tricresyl phosphate, triethyl phosphate, triethylene glycol dinitrate, trimethylolethane trinitrate, metal oxides (alumina, iron oxide, titanium dioxide, zirconium oxide, zinc oxide), talc, glass (both fibers and beads), metal carbonates (including magnesium and calcium), salts (nitrates, perchlorates, sulfates), metals (magnesium, aluminum, iron, silver, copper, gold), carbon black, carbon nanotubes, graphene, graphene oxide, clays, cellulose, nanocellulose, precipitated silica, fumed silica, polyhedral oligomeric silsesquioxane, other polymers and mixtures thereof, preferably said one or more entrained adjuncts being selected from the group consisting of acetyltributylcitrate, benzyl benzoate, benzyl butyl phthalate, bis(2-ethylhexyl) adipate, bis(2-ethylhexyl) phthalate, centralite, 1,2-cyclohexane dicarboxylic acid diisononyl ester, dibutyl phthalate, dibutyl sebacate, diethylene glycol dinitrate, diisobutyl phthalate, diisodecyl phthalate, diisononyl phthalate, dimethyl adipate, dimethyl methylphosphonate, 2,4-dinitrotoluene, dioctyl adipate, dioctyl sebacate, dioctyl terephthalate, dipropylene glycol, biobased oils, ethyl butyrate, ethylene carbonate, furoin, maleic acid dibutyl ester, neopentyl glycol, polybutene, propylene carbonate, triacetin, tributyl phosphate, tricresyl phosphate, triethyl phosphate, triethylene glycol dinitrate, trimethylolethane trinitrate, metal oxides, metal carbonates, salts, metals, carbon black, clays, cellulose, nanocellulose, precipitated silica, fumed silica, other polymers, and mixtures thereof, more preferably said one or more entrained adjuncts being selected from the group consisting of bis(2-ethylhexyl) adipate, bis(2-ethylhexyl) phthalate, dibutyl phthalate, dibutyl sebacate, diisobutyl phthalate, diisodecyl phthalate, diisononyl phthalate, dimethyl adipate, dioctyl adipate, dioctyl sebacate, dioctyl terephthalate, dipropylene glycol, ethyl butyrate, ethylene carbonate, furoin, maleic acid dibutyl ester, neopentyl glycol, polybutene, propylene carbonate, metal oxides, salts, metals, carbon black, cellulose, nanocellulose, fumed silica, other polymers, and mixtures thereof, most preferably said one or more entrained adjuncts being selected from the group consisting of bis(2-ethylhexyl) adipate, dibutyl sebacate, dimethyl adipate, dioctyl adipate, dioctyl sebacate, fumed silica, metals, salts, and mixtures thereof.

A process according to Paragraphs 0030 through 0033, said process comprising casting said composition and optionally thermally post curing said article.

A process according to Paragraphs 0030 through 0034, wherein said composition comprises, based on total composition weight percent of from about 1 wt. % to 30 wt. % of an adjunct selected from the group consisting of fumed silica, nanocellulose, clay, carbon black, and said process comprises direct ink writing said composition, preferably said composition comprises about 3 wt. % to 25 wt. % of an adjunct selected from the group consisting of fumed silica, nanocellulose, clay, carbon black, and said process comprises direct ink writing said composition, more preferably said composition comprises about 5 wt. % to 15 wt. % of an adjunct selected from the group consisting of fumed silica, nanocellulose, clay, carbon black, and said process comprises direct ink writing said composition, most preferably said composition comprises 8 wt. % to 12 wt. % of an adjunct selected from the group consisting of fumed silica, nanocellulose, clay, carbon black, and said process comprises direct ink writing said composition.

A process according to Paragraphs 0030 through 0033, said process comprising VP 3D printing said composition and optionally thermally post curing said article.

A process according to Paragraphs 0030 through 0036 wherein said process comprising thermally post curing said article, preferably said thermally post curing comprises heating the green article in an oven between 40° C. and 150° C. for between 1 minute and 1 week; more preferably said thermally post curing comprises heating the green article in an oven between 50° C. and 120° C. for between 15 minutes and 24 hours, most preferably said thermally post curing comprises heating the green article in an oven between 60° C. and 100° C. for between 1 hour and 4 hours.

A process according to Paragraphs 0030 through 0037 wherein said polymer network is derived from a linear polydiene polymer, a linear polydiene copolymer, hydrogenated vinyl ether-terminated polyolefin and/or vinyl ether terminated poly(tetramethylene oxide), preferably said linear polydiene polymer and said linear polydiene copolymer are selected from the group consisting of linear poly(1,3-butadiene), linear poly(1,4-pentadiene), linear polyisoprene, linear polychloroprene, linear polybromoprene, linear butadiene-acrylonitrile copolymer, and/or linear butadiene styrene copolymer; more preferably said polymer is selected from linear poly(1,3-butadiene), linear polyisoprene, linear polychloroprene, and/or linear polybromoprene; even more preferably said polymer is selected from linear poly(1,3-butadiene), linear polyisoprene, and/or linear polychloroprene; most preferably said polymer is selected from the group consisting of, linear poly(1,3-butadiene) and/or linear polyisoprene. The advantages of using the aforementioned linear polymers include but are not limited to lower cost than branched hydroxyl-terminated polybutadiene; greater flexibility in resin choice with regards to molecular weight, viscosity, glass transition temperature, and polymer microstructure (cis, trans, and vinyl content); easier processing due to lower viscosity; and more flexibility in choice of resin properties like modulus, that can be tuned through formulation.

Test Method

For purposes of the present application vinyl group content of a liquid resin is determined as follows: Nuclear magnetic resonance spectroscopy will be taken of the polymer sample. The peaks corresponding to the vinylidene protons (terminal $CH_2$ group on the vinyl pendent group) will be integrated. The peak corresponding to the protons on the backbone vinylene group (—C=C—) will be integrated. Divide the integration of the vinylidene proton peak by the integration of the vinylene peak to obtain the percent pendent vinyl functionality on the backbone. If the peak from the methine proton from the vinyl overlaps with the vinylene group, that peak area will be subtracted from the peak area of the vinylene peak integral. See Liu et al, *RSC Advances*, 2015, 5, 10231-10242, Figure S1 for an example spectrum. Integrate the peaks from 4.8 ppm to 5.1 ppm, and integrate the peaks from 5.2 ppm to 5.7 ppm. Divide the integral of the peaks at 5 ppm by two and subtract that value from the peak integral 5.4 ppm. Divide the integral at 5 ppm by the value obtained by the value obtained by subtraction. This yields the percentage of repeat units in the backbone that contain a pendent vinyl group, in this case about 3% of the monomers in the backbone are pendent vinyls. That ratio can be multiplied it by the number of repeat units obtained from the molecular weight to get the number of vinyl per chain. For polybutadiene, that represents an upper bound for the number of crosslinks per chain that can be formed. A minimum of two vinyl groups per chain is required to obtain a crosslinked system, when using a polythiol with greater than two thiol groups per molecule. In the cases where there are greater than two vinyl groups per chain on the polymeric species, a polythiol with two thiol groups is sufficient to produce a crosslinked system.

For purposes of this application, the crosslink density is determined using the method outlined by Mujtaba et al., where the plateau modulus is determined using dynamic mechanical analysis, and the modulus is plugged in to the equation $G=vkT$, where G is the rubbery plateau modulus, v is the crosslink density, k is the gas constant, and T is the temperature.

EXAMPLES

The following examples and methods are presented as illustrative of the present invention or methods of carrying out the invention, and are not restrictive or limiting of the scope of the invention in any manner.

Example 1—Direct ink writing with UV cure. Dioctyl adipate (4 g) was added to a mixing cup, after which 0.4 g DMPA and 1.2 g lauroyl peroxide was added, and the mixture was gently heated to dissolve the initiators. Linear polybutadiene with a number average molecular weight of 5500 g/mol (40 g) and 3.2 g 3,6-dioxa-1,8-octanedithiol were added to the mixture, and the liquids were mixed in a dual axis centrifuge at 2300 rpm for 2 minutes. After mixing, 4 g hydrophobic fumed silica was added on top of the liquids and was subjected to a second mixing step for 2 min at 2300 rpm. After the second mixing, a thixotropic paste was obtained, and transferred to a syringe. The syringe was used in a direct ink write printer to print the proof-of-concept article, a disk with approximate dimensions of 25 mm diameter, and approximately 10 mm high. The 10 mm height corresponds to five layers at 2 mm each. Each layer was cured for 5 min in a UV chamber before the next layer was deposited.

Example 2—Thermal casting. Hydroxyl-terminated polybutadiene (25.00 g), 3,6-dioxa-1,8-octanedithiol (2.17 g) and lauroyl peroxide (0.27 g) were added to a mixing cup and mixed in a dual axis centrifuge at 2300 rpm for 2 min. The resulting liquid mixture was poured into a mold and cured at 60° C. for 1.5 hr, yielding a solid monolithic rubber with a Shore A hardness of 10.

Example 3—Thermal casting. Hydroxyl-terminated polybutadiene (5.00 g), 3,6-dioxa-1,8-octanedithiol (0.41 g) and tert-butylperoxy 2-ethylhexyl carbonate (0.27 g) were added to a mixing cup and mixed in a dual axis centrifuge at 2300 rpm for 2 min. The resulting liquid mixture was poured into a mold and cured at 100° C. for 3.5 hr, yielding a solid monolithic rubber with a Shore A hardness of 5.

Example 4—UV Casting. 2,2-dimethoxy-2-phenylacetophenone (0.27 g) was dissolved in 3,6-dioxa-1,8-octanedithiol (2.17 g) with gentle heating. (5 g) Hydroxyl-terminated polybutadiene (25.00 g) was added and mixed in a dual axis centrifuge for 2 minutes at 2300 rpm. The resulting liquid mixture was poured into a mold and irradiated with 350 nm UV light for 5 minutes, yielding a solid monolithic rubber with a Shore A hardness of 41.

Example 5—UV Casting. 2,2-dimethoxy-2-phenylacetophenone (0.27 g) was dissolved in 3,6-dioxa-1,8-octanedithiol (1.64 g) and dioctyl sebacate (6.66 g) with gentle heating. Hydroxyl-terminated polybutadiene (18.87 g) was added and mixed in a dual axis centrifuge for 2 minutes at 2300 rpm. The resulting liquid mixture was poured into a mold and irradiated with 350 nm UV light for 5 minutes, yielding a solid monolithic rubber with a Shore A hardness of 30.

Example 6—UV Casting 2,2-dimethoxy-2-phenylacetophenone (0.053 g) was dissolved in 3,6-dioxa-1,8-octanedithiol (0.300 g) with gentle heating. Polybutadiene with a number average molecular weight of 8000 g/mol. (5 g) was added and mixed in a dual axis centrifuge for 2 minutes at 2300 rpm. The resulting liquid mixture was poured into a mold and irradiated with 350 nm UV light for 5 minutes, yielding a solid monolithic rubber with a Shore A hardness of 11.

Example 7—Direct Ink Writing with thermal cure. Dioctyl adipate (4 g) will be added to a mixing cup, after which 0.4 g DMPA and 1.2 g lauroyl peroxide will be added, and the mixture will be gently heated to dissolve the initiators. Linear polybutadiene with a number average molecular weight of 5500 g/mol. (40 g) and 3.2 g 3,6-dioxa-1,8-octanedithiol will be added to the mixture, and the liquids mixed in a dual axis centrifuge at 2300 rpm for 2 min. After mixing, 4 g hydrophobic fumed silica will be added on top of the liquids and subjected to a second mixing step for 2 min at 2300 rpm. After the second mixing, a thixotropic paste will be obtained, and transferred to a syringe. The syringe will be used in a direct ink write printer to print the proof-of-concept article, a disk with approximate dimensions of 25 mm diameter, and approximately 10 mm high. The 10 mm height corresponds to five layers at 2 mm each. The layers will all be printed consecutively in an uncured state, and the final result of the print will be cured in an oven at 60° C. for 1.5 hr to yield a monolithic disk.

Example 8—Vat photopolymerization. Diphenyl(2,4,6-trimethylbenzoyl)phosphine oxide (1.0 g) was dissolved in 8.0 g 3,6-dioxa-1,8-octanedithiol with gentle heating. Linear polybutadiene with a number average molecular weight of 5500 g/mol (50 g) was added to the cup and mixed in a dual axis centrifuge for 2 min at 2300 rpm. The resulting mixture was used as a resin for VP with a mUVe3D LCD 3D printer. Tensile specimens with dimensions according to ASTM D1708 were printed with a 100 m layer height, ten burn-in layers at 60 s per layer, and 30 s cure time for each subsequent layer.

Example 9—Vat Photopolymerization. Polychloroprene (12.5 g) was dissolved in 50 mL toluene, required for this class of polymer, since it is only available in high molecular weight solid form. This corresponds to 22 wt % polychloroprene in the solution. 50 g of the PC solution, 1.0 g diphenyl(2,4,6-trimethylbenzoyl)phosphine oxide, and 1.5 g 3,6-dioxa-1,8-octanedithiol were mixed in a dual axis centrifuge for 2 min at 2300 rpm. The resulting mixture was used as a resin for VP with a mUVe3D LCD 3D printer. Tensile specimens with dimensions according to ASTM D1708 were printed with a 100 m layer height and 60 s cure time for each layer.

Suitable linear polybutadiene polymers such as LBR-302 or LBR-307 can be obtained from Kuraray. Suitable hydroxyl-terminated polybutadiene such as Poly bd® R-45HTLO can be obtained from Cray Valley. Suitable polychloroprene such as Baypren® 211 can be obtained from Arlanxeo. Suitable fumed silica such as Aerosil® R 805 can be obtained from Evonik. Remaining chemicals can be obtained from Millipore Sigma, Fisher Scientific, and TCI America. An example of the direct ink write printer is the Potterbot Micro 9, and an example of the UV chamber used for cure is the Formlabs Form Cure.

While the present invention has been illustrated by the description of one or more embodiments thereof, and while the embodiments have been described in considerable detail, they are not intended to restrict or in any way limit the scope of the appended claim to such detail. Additional advantages and modification will be readily apparent to those skilled in the art. The invention in its broader aspects is therefore not limited to the specific details, representative apparatus and methods and illustrative examples shown and described. Accordingly, departures may be made from such details without departing from the scope or the spirit of the general inventive concept exemplified herein.

What is claimed is:

1. A process of making an article said process comprising casting, direct ink writing, and/or VP 3D printing a composition comprising:

a) a polydiene polymer, polydiene copolymer, hydrogenated vinyl ether-terminated polyolefin and/or vinyl ether terminated poly(tetramethylene oxide);
b) a polythiol crosslinker selected from the group consisting of 1,4-butanedithiol; 4,5-bis(mercaptomethyl)-o-xylene; 1,4-benzenedithiol; 4,4'-biphenyldithiol; 1,3,5-benzenetrithiol; 2,3-butanedithiol; 1,3-benzenedithiol; 1,10-decanedithiol; DL-dithiothreitol; dithioerythritol; 1,5-dimercaptonaphthalene; 3,6-dioxa-1,8-octanedithiol; 3,7-dithia-1,9-nonanedithiol; 1,2-ethanedithiol; 1,6-hexanedithiol; bis(2-mercaptoethyl) sulfide; 1,8-octanedithiol; 1,9-nonanedithiol 1,3-propanedithiol; 1,5-pentanedithiol; 4,4'-thiobisbenzenethiol; tetra(ethylene glycol) dithiol; 1,11-undecanedithiol; hexa(ethylene glycol) dithiol; 1,16-hexadecanedithiol and mixtures thereof;
c) a UV initiator;
d) an optional adjunct;
e) a thermal initiator is present in said composition, based on total composition weight at a level of from about 0.25 wt. % to about 15 wt. %; and
f) an optional inhibitor;
subjecting said composition to UV light during said casting, direct ink writing, and/or VP 3D printing and thermally post curing said article.

2. A process according to claim 1 wherein:
a) said polymer is present in said composition, based on total composition weight at a level of from about 5 wt. % to about 99 wt. %;
b) said polythiol crosslinker is present in said composition, based on total composition weight at a level of from about 0.1 wt. % to about 30 wt. %;
c) said UV initiator is present in said composition, based on total composition weight at a level of from about 0.25 wt. % to about 15 wt. %;
e) said optional adjunct is present in said composition, based on total composition weight at a level of from about 0 wt. % to about 99 wt. %;
f) said optional thermal initiator said thermal initiator is present in said composition, based on total composition weight at a level of from about 0.25 wt. % to about 15 wt. %; and
g) said optional inhibitor is present in said composition, based on total composition weight at a level of from about 0.01 wt. % to about 5 wt. %.

3. The process of claim 2 wherein said adjunct is present, based on total composition weight at a level of from about 5 wt. % to about 99 wt. %.

4. The process of claim 1 wherein
a) said polymer is selected from the group consisting of said polydiene polymer and said polydiene copolymer are selected from the group consisting of poly(1,3-butadiene), poly(1,4-pentadiene), polyisoprene, polychloroprene, polybromoprene, butadiene-acrylonitrile copolymer, and/or butadiene styrene copolymer;
b) said UV initiator is selected from the group consisting of Acetophenone; anisoin; anthraquinone; (benzene)tricarbonylchromium; benzil; benzoin; benzoin ethyl ether; benzoin isobutyl ether; benzoin methyl ether; benzophenone; 1-hydroxycyclohexyl phenyl ketone; 3,3',4,4'-benzophenonetetracarboxylic dianhydride; 4-benzoylbiphenyl; 2-benzyl-2-(dimethylamino)-4'-morpholinobutyrophenone; 4,4'-bis(diethylamino)benzophenone; 4,4'-bis(dimethylamino)benzophenone; camphorquinone; 2-chlorothioxanthen-9-one; (cumene)cyclopentadienyliron(II) hexafluorophosphate; dibenzosuberenone; 2,2-diethoxyacetophenone; 4,4'-dihydroxybenzophenone; 2,2-dimethoxy-2-phenylacetophenone; 4-(dimethylamino)benzophenone; 4,4'-dimethylbenzil; 2,5-dimethylbenzophenone; 3,4-dimethylbenzophenone; diphenyl(2,4,6-trimethylbenzoyl)phosphine oxide; 2-hydroxy-2-methylpropiophenone; 4'-ethoxyacetophenone; 2-ethylanthraquinone; ferrocene; 3'-hydroxyacetophenone; 4'-hydroxyacetophenone; 3-hydroxybenzophenone; 4-hydroxybenzophenone; 1-hydroxycyclohexyl phenyl ketone; 2-hydroxy-2-methylpropiophenone; 2-methylbenzophenone; 3-methylbenzophenone; methylbenzoylformate; 2-methyl-4'-(methylthio)-2-morpholinopropiophenone; phenanthrenequinone; 4'-phenoxyacetophenone; thioxanthen-9-one and mixtures thereof;
c) said thermal initiator is selected from the group consisting of 2,3-dimethyl-2,3-diphenylbutane; tert-butyl hydroperoxide; tert-amyl hydroperoxide; cumyl hydroperoxide; 1,1,3,3-tetramethylbutyl hydroperoxide; isopropylcumyl hydroperoxide; isopropylcumyl hydroperoxide; 2,5-dimethyl-2,5-di(tert-butylperoxy)hexyne; 3,6,9-triethyl-3,6,9-trimethyl-1,4,7-triperoxonane; di(tert-butyl)peroxide; 2,5-dimethyl-2,5-di(tert-butylperoxy)hexane; di(tert-butylperoxy-isopropyl)benzene; tert-butyl cumyl peroxide; di-(tert-amyl)-peroxide; dicumyl peroxide; butyl 4,4-di(tert-butylperoxy)valerate; tert-butylperoxybenzoate; 2,2-di(tert-butylperoxy)butane; tert-amyl peroxy-benzoate; tert-butylperoxy-acetate; tert-butylperoxy-(2-ethylhexyl)carbonate; tert-butylperoxy isopropyl carbonate; tert-butyl peroxy-3,5,5-trimethyl-hexanoate; 1,1-di(tert-butylperoxy)cyclohexane; tert-amyl peroxyacetate; tert-amylperoxy-(2-ethylhexyl)carbonate; 1,1-di(tert-butylperoxy)-3,5,5-trimethylcyclohexane; 1,1-di(tert-amylperoxy)cyclohexane; tert-butyl-monoperoxy-maleate; 1,1'-azodi(hexahydrobenzonitrile); tert-butyl peroxy-isobutyrate; tert-butyl peroxydiethylacetate; tert-butyl peroxy-2-ethylhexanoate; dibenzoyl peroxide; tert-amyl peroxy-2-ethylhexanoate; di(4-methylbenzoyl)peroxide; 1,1,3,3-tetramethylbutyl peroxy-2-ethylhexanoate; 2,5-dimethyl-2,5-di(2-ethylhexanoylperoxy)hexane; 2,2'-azodi(2-methylbutyronitrile); 2,2'-azodi(isobutyronitrile); didecanoyl peroxide; dilauroyl peroxide; di(3,5,5-trimethylhexanoyl) peroxide; tert-amyl peroxypivalate; tert-butyl peroxyneoheptanoate; 1,1,3,3-tetramethylbutyl peroxypivalate; tert-butyl peroxypivalate; dicetyl peroxydicarbonate; dimyristyl peroxydicarbonate; di(2-ethylhexyl) peroxydicarbonate; di(4-tert-butylcyclohexyl) peroxydicarbonate; diisopropyl peroxydicarbonate; tert-butyl peroxyneodecanoate; di-sec-butyl peroxydicarbonate; tert-amyl peroxyneodecanoate; cumyl peroxyneoheptanoate; di(3-methoxybutyl) peroxydicarbonate; 1,1,3,3-tetramethylbutyl peroxyneodecanoate; cumyl peroxyneodecanoate; diisobutyryl peroxide and mixtures thereof;
d) said optional inhibitor is selected from the group consisting of phenothiazine, quinone monomethyl ether, butylated hydroxytoluene, hydroquinone and mixtures thereof; and
e) said optional adjunct is selected from the group consisting of acetamide, acetyltributylcitrate, benzyl benzoate, benzyl butyl phthalate, bis(2-ethylhexyl) adipate, bis(2-ethylhexyl) phthalate, centralite, 1,2- cyclohexane dicarboxylic acid diisononyl ester, dibutyl phthalate, dibutyl sebacate, diethylene glycol dinitrate, diisobutyl phthalate, diisodecyl phthalate, diisononyl phthalate, dimethyl adipate, dimethyl methylphosphonate, 2,4-dinitrotoluene, dioctyl adipate, dioctyl sebacate, dioctyl terephthalate, dipropylene glycol, biobased oils, epoxidized soybean oil, fatty acids, soybean oil, ethyl butyrate, ethylene carbonate, furoin, linseed oil, maleic acid dibutyl ester, naphtha, neopentyl glycol, paraffin, polybutene, polychlorinated biphenyl, polychlorinated terphenyl, propylene carbonate, tris(1-(2-methyl))aziridinyl phosphine oxide, trimesoyl-1-(2-ethyl)aziridine, tetraethylenepentamine acrylonitrile glycidol adduct, partially cyanoacrylated tetraethylenepentamine, isophthaloyl-bis(methylethyleneimide), triacetin, tributyl phosphate, tricresyl phosphate, triethyl phosphate, triethylene glycol dinitrate, trimethylolethane trinitrate, metal oxides, talc, glass, metal carbonates, salts, metals, carbon black, carbon nanotubes, graphene, graphene oxide, clays, cellulose, nanocellulose, precipitated silica, fumed silica, polyhedral oligomeric silsesquioxane and mixtures thereof.

5. The process of claim 1 said process comprising casting said composition.

6. The process of claim 1 wherein said composition comprises, based on total composition weight percent of from about 1 wt. % to 30 wt. % of an adjunct selected from the group consisting of fumed silica, nanocellulose, clay, carbon black, and said process comprises direct ink writing said composition.

7. The process of claim 1, said process comprising VP 3D printing said composition.

8. The process of claim 1 wherein, said polymer network is derived from a linear polydiene polymer, a linear polydiene copolymer, hydrogenated vinyl ether-terminated polyolefin and/or vinyl ether terminated poly(tetramethylene oxide).

* * * * *